United States Patent [19]
Vensko

[11] Patent Number: 5,806,040
[45] Date of Patent: Sep. 8, 1998

[54] SPEED CONTROLLED TELEPHONE CREDIT CARD VERIFICATION SYSTEM

[75] Inventor: George Vensko, Ramona, Calif.

[73] Assignee: ITT Corporation, New York, N.Y.

[21] Appl. No.: 827,867

[22] Filed: Apr. 11, 1997

Related U.S. Application Data

[63] Continuation of Ser. No. 688,568, Jul. 30, 1996, abandoned, which is a continuation of Ser. No. 177,277, Jan. 4, 1994, abandoned.

[51] Int. Cl.$^6$ .................................................. G10L 7/08
[52] U.S. Cl. ........................ 704/273; 704/233; 704/257; 704/240; 704/270
[58] Field of Search ................................ 395/2.42, 2.66, 395/2.49

[56] References Cited

U.S. PATENT DOCUMENTS

| | | | |
|---|---|---|---|
| 4,052,568 | 10/1977 | Jankowski | 395/2.42 |
| 4,532,648 | 7/1985 | Noso et al. | 395/2.42 |
| 4,610,023 | 9/1986 | Noso et al. | 395/2.42 |
| 4,896,358 | 1/1990 | Bahler et al. | 395/2.66 |
| 5,265,191 | 11/1993 | McNair | 395/2.82 |

*Primary Examiner*—David R. Hudspeth
*Assistant Examiner*—Vijay B. Chawan
*Attorney, Agent, or Firm*—Plevy & Associates

[57] ABSTRACT

A speech controlled verification system for verifying the identity of a person using a telephone calling card, bank card or other credit card. The systems connects the user of the card to a telephone network, wherein the user enters the card number. The card number is used to access a central data base through the telephone network, wherein a voice verification template is retrieved corresponding to the entered card number. The voice verification contains various samples of the authorized user's voice stating selected words, phrases and/or numbers. Once the proper voice verification template is retrieved, the system prompts the user to state one of the words, phrases and/or numbers contained within the voice verification template. The word, phrase and/or numbers stated in response to the prompt is compared with the voice verification template. If the stated words match the template, the user is considered to be the authorized user and the card is validated. If the stated words do not match the voice verification template, the user may or may not be denied authorization depending upon the use of the card and the financial stake being placed in the use of the card.

21 Claims, 5 Drawing Sheets

SPEED CONTROLLED TELEPHONE CREDIT CARD VERIFICATION SYSTEM

This is a continuation of application Ser. No. 08/688,568, filed on Jul 30, 1996, entitled SPEED CONTROLLED TELEPHONE CREDIT CARD VERIFICATION SYSTEM , which is a Continuation of prior application Ser. No. 08/177,277, filed on Jan. 4, 1994, both now abandoned .

FIELD OF THE INVENTION

The present invention relates generally to speech verification systems, wherein a speaker is identified over a telephone network by the specific patterns of the speaker's voice. More particularly, the present invention relates to speech verification systems, used in conjunction with a telephone credit card, to verify the identity of the person utilizing the credit card and prevent unauthorized use.

BACKGROUND OF THE INVENTION

Most long distance telephone companies offer credit card services, wherein the cost of a call from a pay telephone can be charged to the user's own monthly telephone bill. To provide this service, long distance credit card services must identify the person making the call to ensure that an impostor does not use the service under another person's identity. It has been estimated that the aggregate losses to the long distance services due to unauthorized use is in the one to four billion dollar range. Because of the magnitude of these losses, telephone companies are investigating methods of verifying the identity of the caller each time a call is placed. Prior art systems typically provide a lengthy identification number, such as the calling card number, which must be entered via the phone's keypad to initiate the long distance service. Unfortunately, this approach is prone to abuse because the identification number may be easily appropriated by theft, or by simply observing the entry of the identification number by another. Accordingly, a biometric technique, as opposed to a method based solely on the knowledge of a password or possession of a key number, is preferable.

Since telephone communications are primarily used to transmit audio signals, the most evident biometric variable to utilize, in confirming a person's identity, is the speaker's voice. Speech recognition is also the preferred biometric determinant because no additional equipment, other than the telephone receiver is required to analyze the speaker's voice.

The prior art is replete with various voice recognition systems. However, most of these systems, such as those used to operate car phones and the like, are used to operate equipment and are not used to verify the identity of the speaker. The prior art does include some systems that do verify a person by the characteristics of his or her speech. Such systems are exemplified by U.S. Pat. No. 5,054,083 to Naik et al, entitled VOICE VERIFICATION CIRCUIT FOR VALIDATING THE IDENTITY OF AN UNKNOWN PERSON; U.S. Pat. No. 4,910,782 to Watari, entitled SPEAKER VERIFICATION SYSTEM; and U.S. Pat. No. 4,837,804 to Akita, entitled TELEPHONE ANSWERING VOICEPRINT DISCRIMINATING AND SWITCHING APPARATUS. However, such systems are poorly adapted to long distance telephone communications.

There are voice verification methods currently being tested by telephone companies that prompt the user to speak one or more predetermined, short authorization phrases before a connection is made with the called party. The interactive session in which phrases are prompted and spoken takes a substantial period of time. Even without considering the cost of such systems themselves, any savings in fraudulent charges realized by such voice verification systems may be easily offset or negated by other costs associated therewith. Such costs include the additional telephone line connection charges, the additional time consumers must spend to make a call, and the loss of business due to false rejections. Moreover, prior art speaker verification systems have not provided the necessary discrimination between true speakers and impostors to be commercially acceptable in applications where the speaking environment is unfavorable.

Speaker verification over long distance telephone networks presents challenges not previously overcome. Variations in handset microphones result in severe mismatches between speech data collected from different handsets for the same speaker. Further, the telephone channels introduce signal distortions which reduce the accuracy of the speaker verification system. Also, there is little control over the speaking conditions. Finally, the need to prompt the customer to recite a predetermined speech sample and pre-analyze the same associated with prior-art techniques imposes additional costs in the form of additional telephone line connection charges and the additional time customers must spend to place a call.

Accordingly, a need exists in the art for a voice verification system that is rapid, accurate, yet does not cause intrusive false rejections due to long distance telephone call distortion or variations in telephone hand set types.

BRIEF DESCRIPTION OF THE DRAWINGS

For a better understanding of the present invention, reference is made to the following description of exemplary embodiments thereof, considered in conjunction with the accompanying drawings, in which.

SUMMARY OF THE INVENTION

The present invention is a speech controlled verification system for verifying the identity of a person using a telephone calling card, bank card or other credit card. The systems connects the user of the card to a telephone network, wherein the user enters the card number. The card number is used to access a central data base through the telephone network, wherein a voice verification template is retrieved corresponding to the entered card number. The voice verification template contains various samples of the authorized user's voice stating selected words, phrases and/or numbers. Once the proper voice verification template is retrieved, the system prompts the user to state one of the words, phrases and/or numbers contained within the voice verification template. The word, phrase and/or numbers stated in response to the prompt is compared with the voice verification template. If the stated words match the template, the user is considered to be the authorized user and the card is validated. If the stated words do not match the voice verification template, the user may or may not be denied authorization depending upon the use of the card and the financial stake being placed in the use of the card.

In an alternate embodiment the voice verification template for an authorized user may be contained on the card itself. As such, the voice verification template may be read from the card when it is inserted into a telephone, ATM machine or the like. The read voice verification template can then be compared to the user's actual voice at a remote location using a telephone connection. One verified or denied, the verification information can be returned to the telephone or ATM machine and the user authorized or rejected accordingly.

DETAILED DESCRIPTION OF THE INVENTION

The present invention is a voice verification system for verifying the identity of a person by comparing that person's speech patterns to a known standard over a telephone connection. Although the present invention can be used in many different applications where a person's identity is to be verified, such as credit card use, security access and the like, the present invention is especially suitable for use in verifying the identity of a person using a telephone calling card. Accordingly, the present invention will be described in connection with a telephone calling card application.

The use of telephone calling cards is commonplace with most long distance telephone service companies. When using a telephone calling card, the user typically dials the card number plus a four digit personal-identification number (P.I.N). The entered calling card number and P.I.N. number are typically forwarded to the Private Branch Exchange (PBX) of the telephone service company, wherein the information is compared to the verification information present in a database. The present invention improves upon this system by also forwarding a speech sample along with the calling card number and the P.I.N. number. Furthermore, in the preferred embodiment, verification is not performed at the local PBX, but is rather performed at one central location. The use of one central location is advantageous in that all the voice identification templates can all be stored in a single database. As a result, voice verification can be conducted more reliably and more quickly than distributing the duties over various PBX's. Furthermore, voice verification is available throughout the entire telephone network and not just at the effected PBX.

Figure 1:
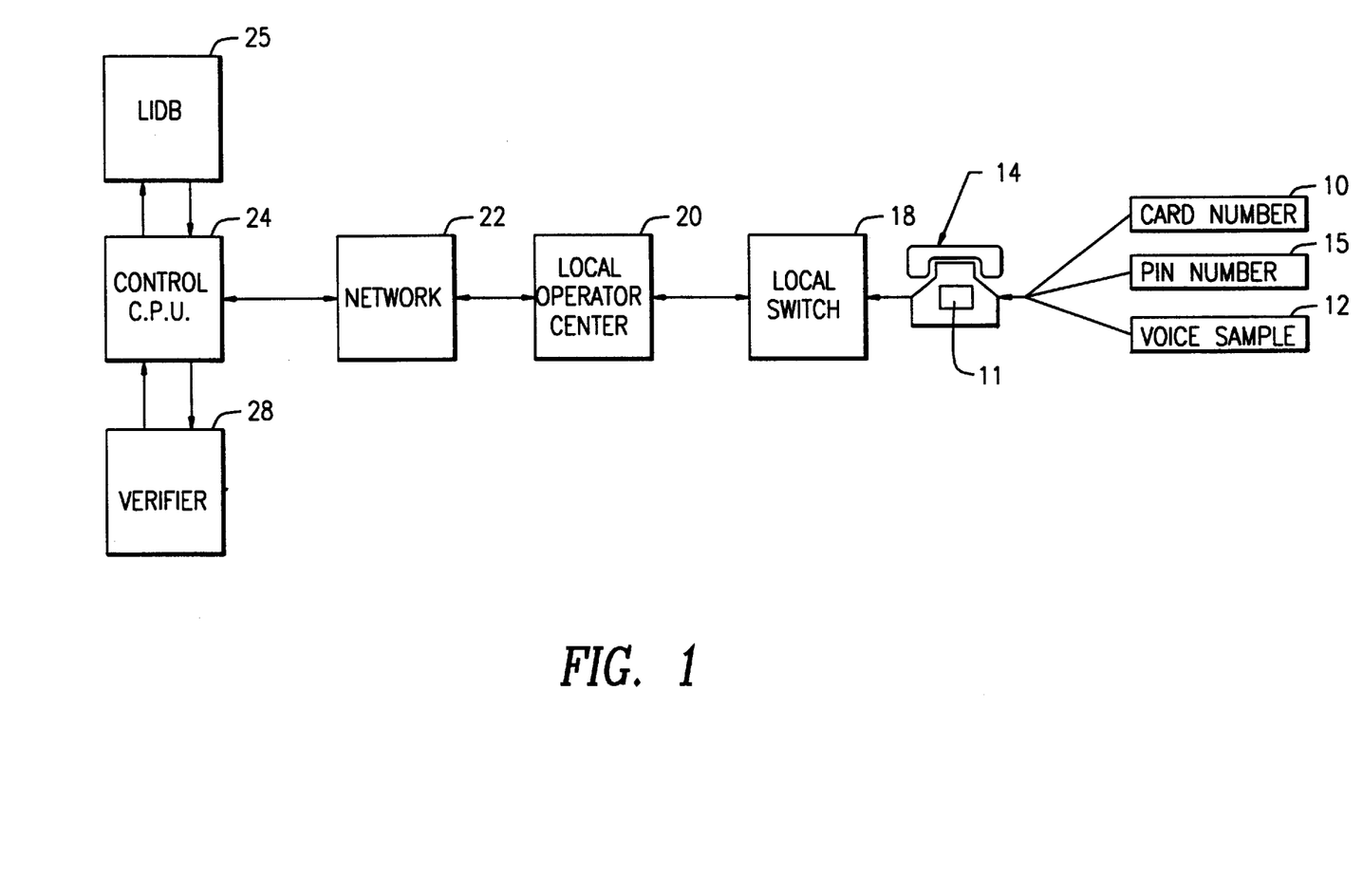
FIG. 1 is a block diagram of one preferred embodiment of the present invention verification system.

Referring to FIG. 1, a first preferred embodiment of the present invention is shown, wherein a caller enters his/her calling card number 10 into the telephone keypad 11 and speaks a voice sample 12 into the telephone receiver 14. A P.I.N. number 15 may also be optionally entered, but is not necessary since the validation procedure will key from the entered voice sample 12. The voice sample 12 can be any vocalization of speech by the user. For example, the use can be prompted to say a specific phrase. Alternatively, the user may state a password when prompted or may simply state the calling card number into the telephone receiver 14. The local switch 18 converts the spoken commands into a-law or u-law pulse-code modulated (PCM) signals which are then forwarded over the telephone lines. In the shown embodiment, the PCM signals are forwarded to a local operator center (LOC) 20 before the signal is received by the telephone service network 22. In many applications, the local switch exchange 18 and LOC 20 would be replaced by a local network PBX. However, the use of a LOC 20 is shown to enable the caller to have recourse to a human operator in the event that the user receives a false rejection, as will later be explained. Once received by the network 22, the calling card number 10, voice sample 12 and optionally the PIN number 15 are read by a control CPU 24 that has access to a Line Interface Data Base (LIDB) 25. The LIDB 25 contains the voice verification templates for all persons having a voice verifiable telephone calling card. The received calling card number 10 and optionally the PIN number 15 are used as the database address code, wherein the voice template sets corresponding to the voice verification number 10 and PIN number 15 are retrieved from the LIDB 25. The use of the optional PIN number 15 may be desirable in situations, such as a family or a small business, where multiple people have access to use of a single telephone calling card. A separate PIN number 15 can be assigned to each member of the family or employee of the business, wherein the PIN number 15 would be used to retrieve the specific voice verification template for that person.

Figure 2:
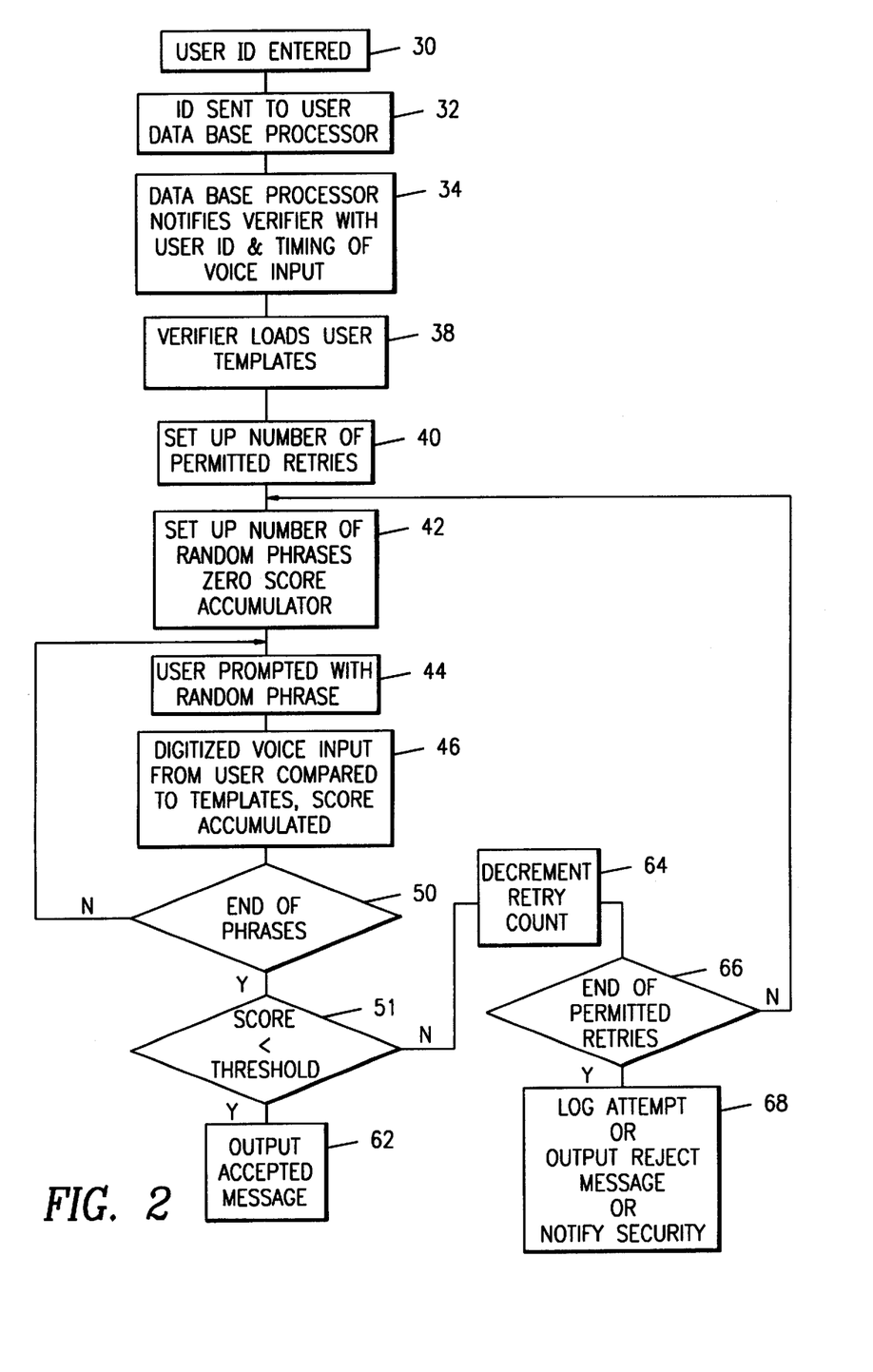
FIG. 2 is a flow diagram showing the preferred method of operation of the embodiment of the present invention shown in FIG. 1.

Once the appropriate voice verification templates are retrieved from the LIDB 25, the verifier 28 compares the voice sample 12 to the voice verification templates and provides either a rejection or approval to the transaction. In FIG. 2, a flow chart of a preferred systems operation is shown corresponding to the structure previously set forth in FIG. 1. Referring to FIG. 2 in conjunction with FIG. 1, it can be seen by Block 30 that the present invention system is operated by a person using his/her telephone calling card and entering his/her identifying information into the receiver. This input information consists of the calling card number and optionally the PIN number. Pursuant to Block 32, this identifying information is sent to the control CPU 24, shown in FIG. 1, which accesses the LIDB 25. Using the calling card number and/or the PIN number as an address code, the control CPU 24 retrieves the corresponding voice verification templates from the LIDB 25. Pursuant to Block 34, the retrieved voice verification templates forwarded to the verifier 28. Once received, the verifier 28 loads the voice verification templates and readies itself to receive the voice sample to be spoken by the user. See Block 38. The voice verification templates are stored digital representations of the authorized users voice. The voice verification templates are obtained when the user originally signs up for the voice verifiable telephone calling card. During this initiation period, the user may be requested to speak several words, phrases and numbers into the telephone. These same words, phrases and numbers may have to be repeated several times until an accurate voice verification template can be obtained for the user.

The verifier 28 compares the voice sample to the voice verification template utilizing any of the numbers voice verification algorithms currently used in the art. However, by utilizing a set right-to-wrong threshold ratio and by utilizing a voice verification template representative of the speaker's average voice characteristics over several spoken attempts, the number of false rejections can be greatly reduced. Additionally, when collecting the voice samples so as to make the voice verification templates, different voice samples can be filtered in a manner that simulates the most commonly occurring long distance line and telephone speaker distortions. Consequently, the voice verification template eventually collected would be able to verify the speaker's voice despite and common distortions that occur from the long distance line the speaker is using.

In Block 40, a number is selected that is representative of the permitted number of tries a user has to match his/her voice to the voice verification template. This number is arbitrarily set at three, but any other number can also be used. Once the appropriate voice verification templates are retrieved, the control CPU 24 selects the appropriate samples from the voice verification template. As indicated by Block 42, random phrases, words or numbers can be selected from the voice verification template. The use of a random selection would prevent an unauthorized user from taping the voice of an authorized user in order to falsely gain approval. Although the use of random phrases is preferred, the feature is optional and a known set password or numerical sequence can also be selected from the voice verification template. The use of a known word decreases security but also decreases process time, complexity and user frustration.

Regardless to what word, phrase or number is selected by the control CPU 24 from the voice verification template, the selection is prompted to the user over the telephone connection. See Block 44. In response to the prompt, the user states the selected word, phrase or number into the telephone receiver. The voice sample, after having been digitized by the telephone handset, is read over the telephone connection and into the verifier 28. In Block 46, the voice sample spoken by the user is compared to the voice verification template retrieved from the LIDB, within the verifier 28. If only one word, phrase or number is to be spoken the verifier 28 makes the valid/invalid determination. However, if multiple words, phrases or numbers are to be spoken, the verifier 28 analyses each word, phrase or number and keeps a running score of valid comparisons and invalid comparisons. At the end of the prompted sequence, as shown by Blocks 50 and 51, the accumulated score of valid and invalid comparisons is compared to a threshold ratio, i.e. 5:3 or any other desired ratio. If the measured valid/invalid ratio surpasses the threshold, the calling card is validated and the user's call is continued without interruption. As indicated by Block 62, the user may be prompted with a short message indicating that his/her voice has been verified.

Should the voice sample provided by the user not be approved, the user may be prompted with another word, phrase or number, wherein the user is allowed to again try to have his/her voice verified. Prior to the system re-prompting the user, the system counts the number of retries the user has been allotted, as indicated by Block 64. Should the number of retries allotted the user equal or surpass the predetermined number of allowed retries, no further attempts are afforded to the user. As indicated by Blocks 66 and 68, should the number of attempts surpass the number of allowable tries, the system no longer prompts the user and performs a second function appropriate for a possible unauthorized user. In a preferred embodiment, the user should be connected to a human operator, should the user fail the voice verification procedure. The operator could then query the user for additional data for verification and can check to see if the card has been listed as stolen or lost. Since it is preferred that the user be connected to an operator, the original telephone call is directed through a Local Operator Center (LOC), see FIG. 1, instead of an automated PBX. In an alternate embodiment, for use especially in low dollar value transactions, the call made by the user may be completed regardless to whether or not the user passes the voice verification test. In such a situation, the verification rejection may be logged and the authorized user later notified of the potential unauthorized use. However, should a pattern of two or more consecutive unverified uses occur, or if the unverified use is for an expensive call, the user will be denied approval and the authorized user will be notified of the potential unauthorized user. By allowing low cost unverified calls to be approved, the frustration due to false rejects and wasted time can be eliminated while still providing the user with protection against expensive misuses by unauthorized persons.

Although any word, phrase or number can be used as the voice sample, in an alternately preferred embodiment the voice sample to be spoken is the calling card number. In this manner, the user need not manually enter his/her calling card number into the telephone and then provide a voice sample. By speaking the calling card number into the telephone, both steps are preformed simultaneously. This method has the advantage of minimizing the user's required interaction on the telephone during calling and verification process. In operation, such a system would work by the user calling a 1-800 toll free number that connects the user to a telephone service network. At a tone prompt, the user states his/her credit card number or portion thereof into the telephone along with other information such as his/her name. The stated numbers and name are digitized at the local switch or local operator center, wherein the digital data is sent to the verifier. The card number is then identified with speaker independent recognition. The identified card number is used to identify the voice verification templates and the verification continues as set forth in the flow diagram of FIG. 2.

Figure 3:
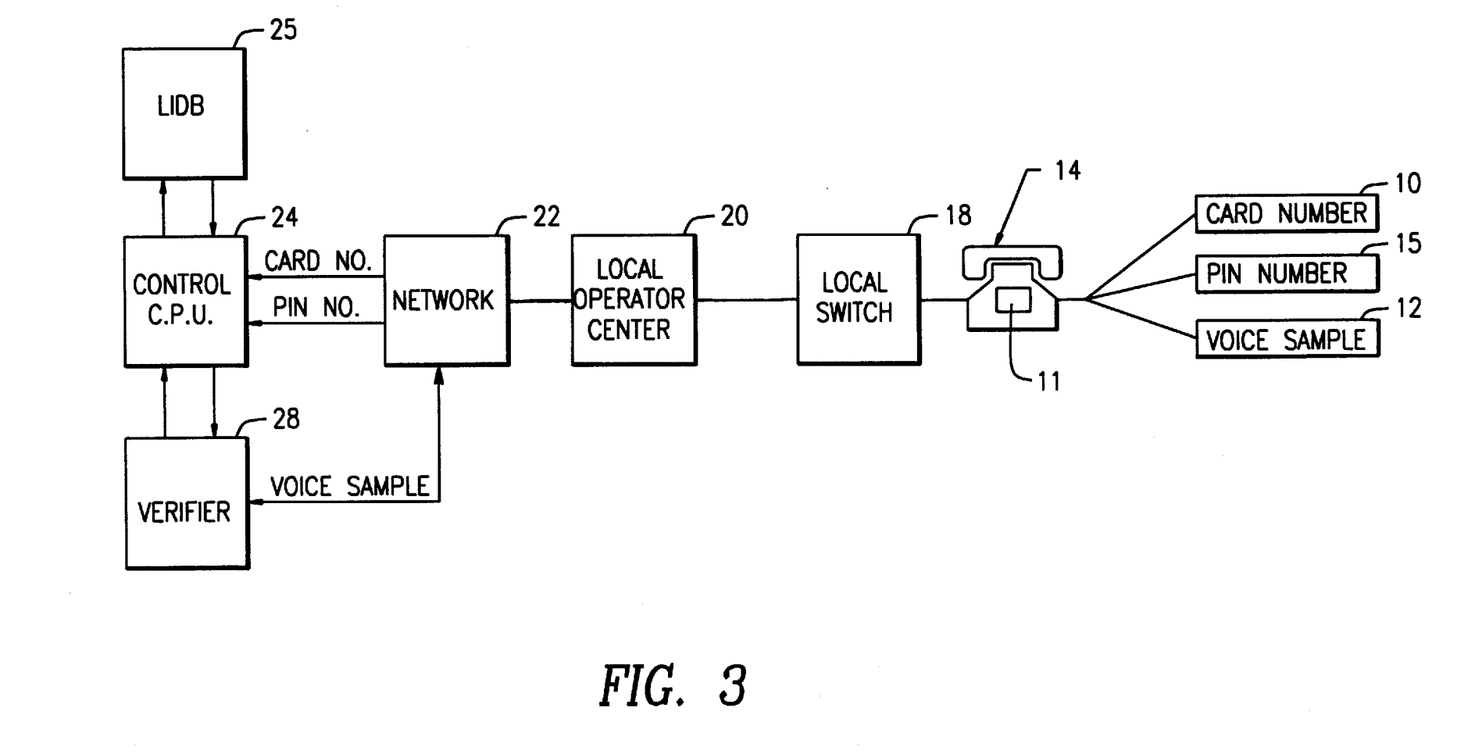
FIG. 3 is a block diagram of an alternate embodiment of the present invention verification system.

Referring now to FIG. 3, there is shown an alternate embodiment of the present invention system. In FIG. 3, the user enters his/her calling card number 10, voice sample 12 and optionally the PIN number 15 into the telephone receiver 14. The identifying information is forwarded to the telephone service network 22 through the local switch exchange 18 and the LOC 20 as previously described in regard to FIG. 1. However, in the embodiment of FIG. 3, the telephone service network 22 directs the received voice sample 12 directly to the verifier 28, while the calling card number and optional PIN number are directed to the control CPU 24. The control CPU 24 retrieves the appropriate voice verification templates from the LIDB 25 and forwards the same to the verifier 28. The verifier 28 compares the voice verification templates to the received voice sample 12 and returns a yes/no verification to the control CPU 24.

Figure 4:
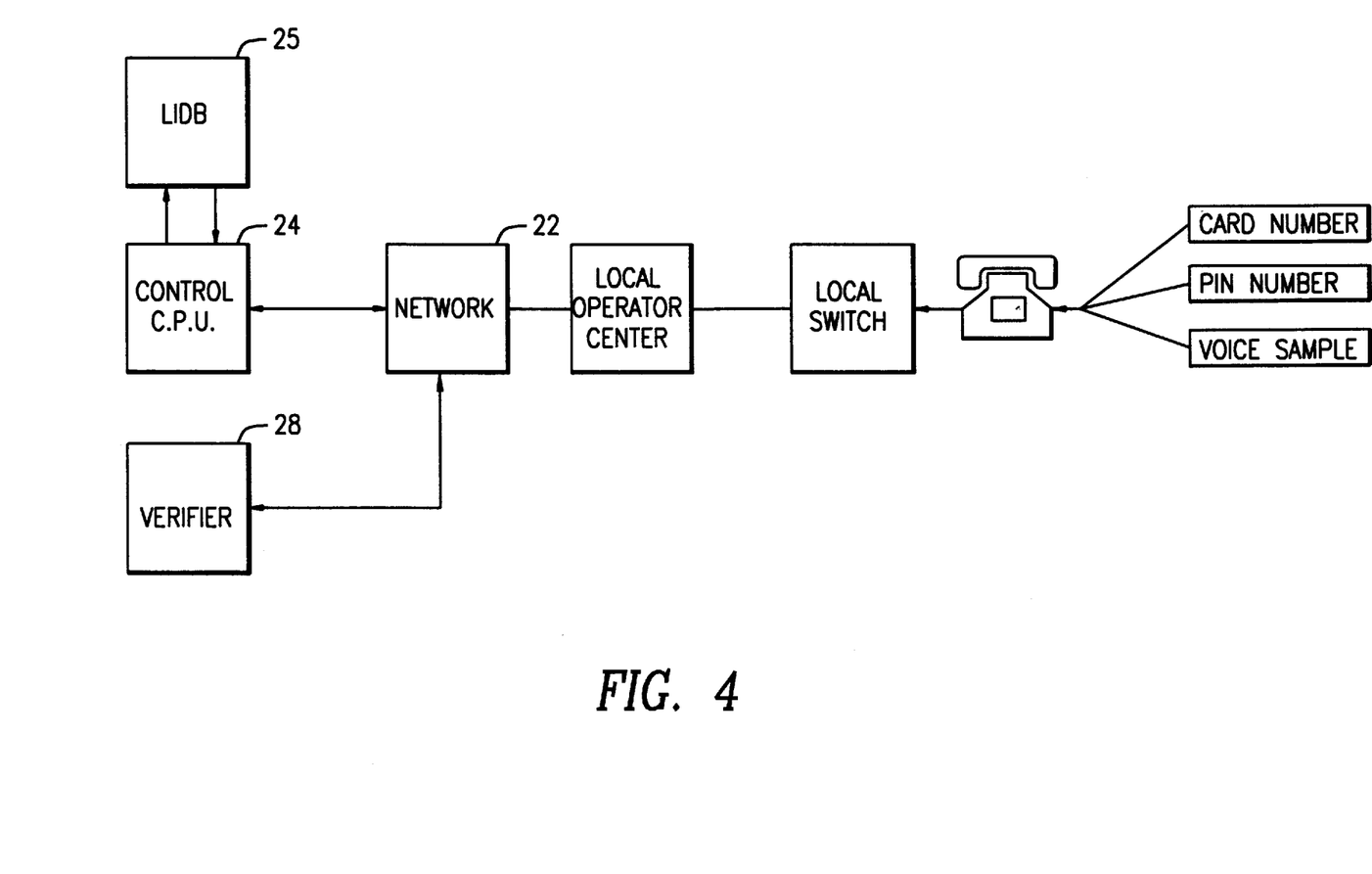
FIG. 4 is a block diagram of a second alternate embodiment of the present invention verification system.

In FIG. 4, yet another embodiment is shown wherein the verifier 28 is not directly interconnected to the control CPU 24 or the LIDB 25. Rather, the control CPU 24 retrieves the appropriate voice verification templates from the LIDB 25 and forwards the same to telephone service network 22. The telephone service network 22 then forwards the voice verification templates to the verifier 28 for verification. The results of the verification are then returned to the telephone service network 22, directly.

Figure 5:
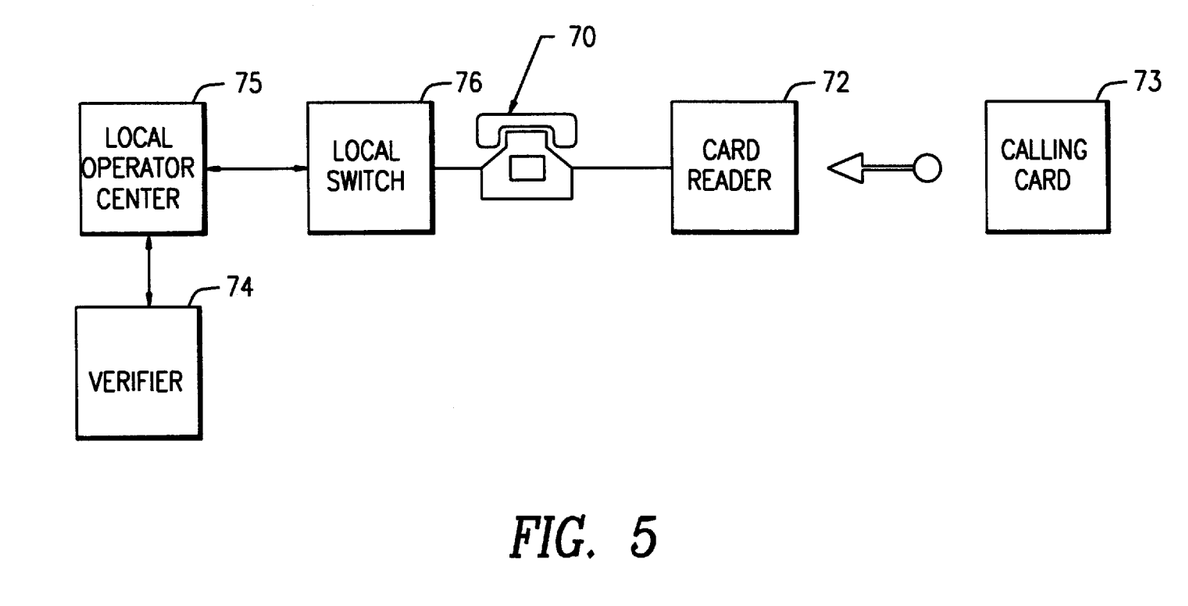
FIG. 5 is a block diagram of a different application of the present invention verification system used in conjunction with a device that utilizes a card reader.

The storage of voice verification templates at a central location, is necessary for users who merely dial their calling card number into a standard touch-tone telephone receiver. However, there are specialized telephone receivers capable of reading information directly from a card inserted into a receptacle on the receiver. Additionally, automated teller machines (ATM's) and like systems that require user verification are also capable of reading information directly off of a card inserted into that mechanism. In such a system capable of directly reading a card, the voice verification templates of the user may be contained on the card in the form of a digitized magnetic tape recording, bar code or the like. Referring to FIG. 5, there is shown a block diagram of the present invention adapted to a card reading telephone 70, ATM machine or like apparatus. The card reading telephone 70 includes a card reading means 72 capable of reading information contained within a calling card 73. A user would insert his/her card 73 into the card reading means 72, wherein the user would be able to use the telephone 70. The calling card 73, itself would contain the voice verification templates of the authorized user. This information, along with the calling card number are forwarded over the phone lines to a central verifier 74, via a Local Operator Center 75, local switch exchange 76 or other PBX. The user would then be prompted to provide a voice sample. The voice sample would also be sent over the telephone lines to the verifier 74, wherein the verifier 74 would compare the voice sample to the retrieved voice verification templates. By encrypting the voice verification templates on the calling card itself, the need for retrieving the voice verification templates from a line interface data base is eliminated, thereby decreasing the time and complexity of the voice verification procedure.

In an application of an ATM machine, a similar operations diagram to FIG. 5 can be used when the ATM machine is substituted for the card reading telephone. In such a system, a user would insert his/her card into the ATM machine, the ATM machine would read the voice verification template from the card and prompt the user for an appropriate voice sample. The read voice verification templates and the received voice sample are sent over an automatically dialed or continuous telephone connection to a central or local exchange verifier that is capable of comparing the voice sample to the voice verification template. In such a manner, voice verification can be accomplished in a very quick, uncomplex and inexpensive manner.

It will be understood that the present invention, speech controlled telephone card verification system, described herein is merely exemplary and a person skilled in the art of such systems may make numerous variations and modifications to the described embodiments utilizing functionally equivalent components to those described. All such variations and modification are intended to be included within the scope of the invention as defined by the appended claims.

What is claimed is:

1. A method of authorizing a person to use a card which has an identifying card number, comprising the steps of:
creating a voice verification template for the authorized user of each said card;
storing each said voice verification template in a databank at a central location accessible by a telephone network;
retrieving the voice verification template from said databank that corresponds to said card number;
prompting repeatedly the person using the card to speak a plurality of words, wherein the number of repeated promptings is selectively determined; and
comparing repeatedly said plurality of words spoken to said voice verification template by utilizing a set right-to-wrong threshold ratio, wherein said fractional threshold ratio of wrong to right is greater than 0, in order to count the number of properly verified responses which determines whether the person using the card is the authorized user.

2. The method according to claim 1, further including the step of comparing the number of verified responses to a threshold number, whereby the person using the card is approved if the number of verified responses surpasses said threshold number.

3. The method according to claim 1, wherein said step of prompting the person using the card to speak at least one word is repeated a predetermined number of times if the words spoken by the person using the card do not match the voice verification template.

4. The method according to claim 1, wherein said card is a telephone calling card, wherein a person using the card to place a call within said telephone network.

5. The method according to claim 4, wherein said telephone network determines the fee rate for a call and allows the person using the card to complete the call regardless of voice verification when the fee rate is below a predetermined value, thereby preventing false rejection of a person using the card to make a call at a fee rate below said predetermined value.

6. The method according to claim 4, further including the step of connecting the person using the card to an operator should the words spoken by that person not match the voice verification template.

7. The method according to claim 1, wherein the step of prompting the person using the card to speak at least one word includes the substep of randomly selecting at least one word from the voice verification template and prompting the person using the card with the randomly selected at least one word.

8. The method according to claim 1, wherein said step of comparing said at least one word spoken to said voice verification template includes reading said voice verification template and said at least one word spoken to a verifier at said central location, wherein said verifier compares said at least one word spoken to said voice verification template and indicates to the telephone network whether said at least one word spoken matches said voice verification template.

9. The method according to claim 1, wherein said step of creating the voice verification template includes the use of voice samples that have been filtered to include long distance telephone distortion.

10. A method of authorizing a person to use a telephone calling card with an identifying card number, comprising the steps of:
prompting repeatedly the person using the calling card to state the identifying card number into a telephone receiver, wherein the number of repeated promptings is selectively determined;
retrieving a voice verification template from a central database that corresponds to the identifying card number stated; and
comparing repeatedly the identifying card number stated to the voice verification template by utilizing a set right-to-wrong threshold ratio, wherein said fractional threshold ratio of wrong to right is greater than 0, in order to count the number of properly verified responses which determines whether the voice of the person using the card matches the voice verification template before use of the calling card is authorized.

11. The method according to claim 10, further including the step of prompting the person using the calling card to state at least one other word in addition to said identifying card number into said telephone receiver, wherein said at least one other word is compared to said voice verification template to verify whether the person using the card is authorized to do so.

12. The method according to claim 11, wherein said step of prompting the person using the calling card to state at least one other word, further includes the substep of randomly selecting at least one word from the voice verification template and prompting the person using the calling card with the randomly selected at least on word.

13. The method according to claim 10, wherein the step of prompting the person using the calling card includes requiring the person using the card to access a telephone network by dialing a predetermined number.

14. The method according to claim 13, wherein said telephone network determines the fee rate for a call and allows the person using the calling card to complete the call regardless of voice verification when the fee rate is below a predetermined value, thereby preventing false rejections of a person using the calling card to make a call at a fee rate below said predetermined value.

15. A method of verifying the authority of a person to use a card having an identifying card number, wherein the card is used to enable a device by placing the card in a card reader coupled to the device, said method comprising the steps of:

creating a voice verification template for the person authorized to use each said card;

storing the voice verification template on the card;

automatically reading said voice verification template from said card when the card is placed in said card reader;

prompting repeatedly the person using the card to speak a plurality of words, wherein the number of repeated promptings is selectively determined; and comparing repeatedly said plurality of words spoken to said voice verification templates by utilizing a right-to-wrong threshold ratio ratio, wherein said fractional threshold ratio of wrong to right is greater than 0, in order to count the number of properly verified responses which determines whether the person using the card is an authorized user.

16. The method according to claim 15, wherein said step of comparing said at least one word spoken to said voice verification templates includes forwarding said at least one word spoken and said voice verification template over a telephone connection to a remote voice verification unit.

17. The method according to claim 16, wherein said card is a telephone calling card and said device is a telephone.

18. The method according to claim 6, wherein said voice verification unit is located at a central location accessible through a telephone network.

19. The method according to claim 15, wherein said card is a bank card and said device is an automated-teller machine.

20. The method according to claim 15, wherein said step of prompting the person using the card to speak at least one word further includes the substep of randomly selecting said at least one word from said voice verification template.

21. A method of authorizing a person to use a card which has an identifying card number, comprising the steps of:

creating a voice verification template corresponding to said identifying card number;

storing said voice verification template in a databank at a central location accessible by a telephone network;

retrieving said voice verification template that corresponds to said identifying card number from said databank;

randomly selecting a plurality of words, phrases or numbers from said voice verification template;

prompting said person seeking authorization to speak each of said selected plurality of words, phrases or numbers;

comparing each of said spoken plurality of words, phrases or numbers to each of said selected plurality of words, phrases or numbers from said voice verification template, and responsively updating a right-to-wrong ratio accordingly;

authorizing a user if said right-to-wrong ratio is greater than a determined threshold for the authorization sought by said person, wherein said determined threshold is less than 100%.

* * * * *

UNITED STATES PATENT AND TRADEMARK OFFICE
CERTIFICATE OF CORRECTION

PATENT NO.     : 5,806,040
DATED          : September 8, 1998
INVENTOR(S)    : Vensko It is certified that error appears in the above-identified patent and that said Letters Patent is hereby corrected as shown below:

<u>Title page, Item [54] and Column 1, lines 1-2,</u>
The Title presently reads as follows: "SPEED CONTROLLED TELEPHONE CREDIT CARD VERIFICATION SYSTEM" and should be corrected to read
-- SPEECH CONTROLLED TELEPHONE CREDIT CARD VERIFICATION SYSTEM --

Signed and Sealed this

Twentieth Day of August, 2002

*Attest:*

*Attesting Officer*

JAMES E. ROGAN
*Director of the United States Patent and Trademark Office*